United States Patent
Yin et al.

(10) Patent No.: US 10,268,950 B2
(45) Date of Patent: Apr. 23, 2019

(54) FACE DETECTION USING MACHINE LEARNING

(71) Applicant: Beijing Kuangshi Technology Co., Ltd., Beijing (CN)

(72) Inventors: Qi Yin, Beijing (CN); Zhimin Cao, Beijing (CN); Kai Jia, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 609 days.

(21) Appl. No.: 14/406,927

(22) PCT Filed: Nov. 15, 2014

(86) PCT No.: PCT/CN2014/091210
§ 371 (c)(1),
(2) Date: Dec. 10, 2014

(87) PCT Pub. No.: WO2016/074247
PCT Pub. Date: May 19, 2016

(65) Prior Publication Data
US 2016/0140436 A1 May 19, 2016

(51) Int. Cl.
*G06N 20/00* (2019.01)
*G06N 3/08* (2006.01)
(Continued)

(52) U.S. Cl.
CPC ........... *G06N 3/08* (2013.01); *G06K 9/00288* (2013.01); *G06K 9/4619* (2013.01); *G06K 9/628* (2013.01);
(Continued)

(58) Field of Classification Search
None
See application file for complete search history.

(56) References Cited

U.S. PATENT DOCUMENTS 5,274,714 A * 12/1993 Hutcheson ......... G06K 9/00221
382/157
7,440,930 B1 * 10/2008 Brandt ..................... G06N 3/08
706/30
(Continued)

OTHER PUBLICATIONS

Osuna, E. et al. (1997). "Training Support Vector Machines: an Application to Face Detection." IEEE. 1997. pp. 130-136.*
(Continued)

*Primary Examiner* — Li B. Zhen
*Assistant Examiner* — Benjamin J Buss
(74) *Attorney, Agent, or Firm* — Fenwick & West LLP

(57) ABSTRACT

A disclosed face detection system (and method) is based on a structure of a convolutional neural network (CNN). One aspect concerns a method for automatically training a CNN for face detection. The training is performed such that balanced number of face images and non-face images are used for training by deriving additional face images from the face images. The training is also performed by adaptively changing a number of trainings of a stage according to automatic stopping criteria. Another aspect concerns a system for performing image detection by integrating data at different scales (i.e., different image extents) for better use of data in each scale. The system may include CNNs automatically trained using the method disclosed herein.

15 Claims, 6 Drawing Sheets

(51) Int. Cl.
G06N 3/04 (2006.01)
G06K 9/66 (2006.01)
G06K 9/62 (2006.01)
G06K 9/46 (2006.01)
G06K 9/00 (2006.01)

(52) U.S. Cl.
CPC ............. *G06K 9/66* (2013.01); *G06N 3/0454* (2013.01); *G06N 20/00* (2019.01)

(56) References Cited

U.S. PATENT DOCUMENTS

| | | | | |
|---|---|---|---|---|
| 9,330,171 | B1* | 5/2016 | Shetty | G06F 17/30784 |
| 2002/0102024 | A1* | 8/2002 | Jones | G06K 9/00248 |
| | | | | 382/225 |
| 2006/0133699 | A1* | 6/2006 | Widrow | G06N 3/02 |
| | | | | 382/305 |
| 2009/0226081 | A1* | 9/2009 | Zhou | G06K 9/6206 |
| | | | | 382/159 |
| 2010/0088490 | A1* | 4/2010 | Chakradhar | G06N 3/063 |
| | | | | 712/34 |
| 2011/0222724 | A1* | 9/2011 | Yang | G06K 9/00248 |
| | | | | 382/103 |
| 2011/0304541 | A1* | 12/2011 | Dalal | G06F 3/017 |
| | | | | 345/158 |
| 2012/0191633 | A1* | 7/2012 | Liu | E21B 47/0007 |
| | | | | 706/12 |
| 2013/0259372 | A1* | 10/2013 | Xu | G06K 9/00624 |
| | | | | 382/170 |
| 2014/0139633 | A1* | 5/2014 | Wang | G06K 9/00201 |
| | | | | 348/46 |
| 2014/0185887 | A1* | 7/2014 | Wu | G06K 9/6231 |
| | | | | 382/128 |
| 2014/0288928 | A1* | 9/2014 | Penn | G10L 15/16 |
| | | | | 704/232 |
| 2014/0300758 | A1* | 10/2014 | Tran | H04N 5/225 |
| | | | | 348/207.1 |
| 2015/0006444 | A1* | 1/2015 | Tamatsu | G06N 3/082 |
| | | | | 706/12 |
| 2015/0347822 | A1* | 12/2015 | Zhou | G06K 9/4628 |
| | | | | 382/118 |
| 2016/0379044 | A1* | 12/2016 | Tang | G06K 9/00288 |
| | | | | 382/118 |
| 2017/0147868 | A1* | 5/2017 | Sun | G06K 9/00281 |

OTHER PUBLICATIONS

Lawrence, S. (1997). "Face Recognition: A Convolutional Neural-Network Approach". IEEE Transactions on Neural Networks, vol. 8, No. 1, Jan. 1997. pp. 98-113.*
Bhowan, U. (2009). "Genetic Programming for Image Classification with Unbalanced Data". 24th International Conference Image and Vision Computing New Zealand (IVCNZ 2009). IEEE. pp. 316-321.*
Mitchell, C. (2010). "Applications of Convolutional Neural Networks to Facial Detection and Recognition for Augmented Reality and Wearable Computing." Thesis, Cooper Union for the Advancement of Science and Art, Albert Nerken School of Engineering. May 3, 2010.*
Telatar, Z. et al. (Aug. 2007). Neural network based face detection from pre-scanned and row-column decomposed average face image. In International Conference on Advanced Concepts for Intelligent Vision Systems (pp. 297-309). Springer, Berlin, Heidelberg.*
Krizhevsky, A. et al. (2012). "Innagenet classification with deep convolutional neural networks". In Advances in neural information processing systems (pp. 1097-1105). (Year: 2012).*
Zeng, M. et al. (Nov. 2014). "Convolutional neural networks for human activity recognition using mobile sensors". In Mobile Computing, Applications and Services (MobiCASE), 2014 6th International Conference on (pp. 197-205). IEEE. DOI:10.4108/icst.mobicase.2014.257786 (Year: 2014).*
Lin, M. et al. (Mar. 2014). "Network in network". arXiv preprint arXiv:1312.4400v3. 10 pages. (Year: 2014).*
Hinton, G. E. et al. (2012). "Improving neural networks by preventing co-adaptation of feature detectors". arXiv preprint arXiv: 1207.0580. 18 pages. (Year: 2012).*
Sainath, T. N. et al. (May 2013). "Deep convolutional neural networks for LVCSR". In Acoustics, speech and signal processing (ICASSP), 2013 IEEE international conference on(pp. 8614-8618). IEEE. DOI: 10.1109/ICASSP.2013.6639347 (Year: 2013).*
Abdel-Hamid, O. et al. (Aug. 2013). "Exploring convolutional neural network structures and optimization techniques for speech recognition". 5 pages. (Year: 2013).*
Bergstra J. et al., "Theano: a CPU and GPU math expression compiler in Python". Proceedings of the $9^{th}$ Python in Science Conference (SciPy), 2010, pp. 1-7.
Bourdev L. et al., "Robust object detection via soft cascade", IEEE CVPR, 2005, vol. 2, pp. 236-243.
Brubaker S. et al., "On the design of cascades of boosted ensembles for face detection", Int J. Comput Vis, 2008, vol. 77, pp. 65-86.
Cevikalp H. et al., "Efficient object detection using cascades of nearest convex model classifiers", IEEE CVPR, 2012, pp. 3138-3145.
Denton E. et al., "Exploiting linear structure within convolutional networks for efficient evaluation". arXiv preprint arXiv:1404.0736v2, 2014, pp. 1-11.
Duchi J. et al., "Adaptive subgradient methods for online learning and stochastic optimization", Journal of Machine Learning Research, 2011, pp. 2121-2159, vol. 12.
Erhan D. et al., "Scalable object detection using deep neural networks", 2014 IEEE Conference on Computer Vision and Pattern Recognition, 2014, pp. 2155-2162.
Erhan D. et al., "Why does unsupervised pre-training help deep learning?", Journal of Machine Learning Research 2010, pp. 625-660, vol. 11.
Feraud R. et al., "A fast and accurate face detector based on neural networks", IEEE Transactions on Pattern Analysis and Machine Intelligence, 2001, pp. 42-53, vol. 23(1).
Garcia C. et al., "Convolutional face finder: A neural architecture for fast and robust face detection", IEEE Transactions on Patters Analysis and Machine Intelligence, Nov. 2004, pp. 1408-1423, vol. 26(11).
Giusti A. et al., "Fast image scanning with deep max-pooling convolutional neural networks", Technical Report No. IDSIA-01-13 arXiv preprint arXiv:1302.1700, 2013, 11 Pages.
Huang C. et al., "Vector boosting for rotation invariant multi-view face detection", Proceedings of the Tenth IEEE International Conference on Computer Vision, 2005, vol. 1, pp. 446-453.
Jaderberg M. et al., "Speeding up convolutional neural networks with low rank expansions", arXiv preprint arXiv: 1405.3866v1, 2014, pp. 1-12.
Jain V. et al., "FDDB: A benchmark for face detection in unconstrained settings", Technical Report UM-CS-2010-009, 2010, pp. 1-11, University of Massachusetts, Amherst.
Krizhevsky A. et al., "Imagenet classification with deep convolutional neural networks", NIPS, 2012, pp. 1-9, vol. 1.
Lecun Y. et al., "Backpropagation applied to handwritten zip code recognition", Neural Computation, 1989, pp. 541-551, vol. 1, Massachusetts Institute of Technology.
Lecun, Y. et al., "Gradient-based learning applied to document recognition", Proceedings of the IEEE, 1998, pp. 2278-2324, vol. 86.
Li S. et al., "Statistical learning of multi-view face detection", ECCV, 2002, pp. 67-81, A. Heyden et al. (Eds.), Springer.
Li J. et al., "Learning SURF cascade for fast and accurate object detection", IEEE Conference on Computer Vision and Pattern Recognition, 2013, pp. 3468-3475.
Li H et al., "Efficient boosted exemplar-based face detection", 2014 IEEE Conference on Computer Vision and Pattern Recognition, 2014, pp. 1843-1850.
Lienhart R. et al, "An extended set of haar-like features for rapid object detection", IEEE ICIP, vol. 1, 2002, pp. I-900-I-903.

(56) References Cited

OTHER PUBLICATIONS

Lin Y. et al., "Robust face detection with multi-class boosting". Proceedings of the 2005 IEEE Computer Society Conference on Computer Vision and Pattern Recognition, 2005, vol. 1. pp. 680-687.

Mamalet F. et al. "Simplifying ConvNets for fast learning", ICANN, 2012, Part II, LNCS 7553, pp. 58-65, Springer-Verlag Berlin Heidelberg.

Nair V. et al., "Rectified linear units improve restricted Boltzmann machines", Proceedings of the $27^{th}$ International Conference on Machine Learning, 2010, pp. 807-814, Haifa Israel.

Osadchy M. et al., "Synergistic face detection and pose estimation with energy-based models", Journal of Machine Learning Research, 2007, pp. 1197-1215, vol. 8.

Rowley H. et al., "Rotation invariant neural network-based face detection", IEEE CVPR, 1998, pp. 38-44.

Sermanet P. et al., "Overfeat: Integrated recognition, localization and detection using convolutional networks", arXiv preprint arXiv, 2013, pp. 1-16, vol. 1312-6229v4.

Shen, X. et al., "Detecting and aligning faces by image retrieval", IEEE Conference on Computer Vision and Pattern Recognition, 2013, pp. 3460-3467.

Sung K.K. et al., "Example-based learning for view-based human face detection", IEEE Transactions on Pattern Analysis and Machine Intelligence, Jan. 1998, pp. 39-51, vol. 20(1).

Szegedy C. et al., "Deep neural networks for object detection", NIPS, 2013, pp. 1-9.

Toshev A. et al., "DeepPose: Human pose estimation via deep neural networks" arXiv, 2014, pp. 1-9, vol. 1312.4659v3.

Viola P. et al., "Rapid object detection using a boosted cascade of simple features", IEEE CVPR. vol. 1, 2001, pp. I-511-I-518.

Wu B. et al., "Fast rotation invariant multi-view face detection based on real Adaboost", Proceedings of the Sixth IEEE International Conference on Automatic Face and Gesture Recognition, 2004, pp. 79-84.

Yan J. et al., "The fastest deformable part model for object detection". IEEE Conference on Computer Vision and Pattern Recognition, 2014, pp. 2497-2504.

Zeiler M.D. et al., "Adadelta: An adaptive learning rate method", arXiv preprint arXiv:1212.5701, 2012, 6 Pages.

Zhang C. et al., "A survey of recent advances in face detection" Technical Report MSR-TR-2010-66, Jun. 2010, 17 Pages Microsoft Research.

Zhou E. et al., "Extensive facial landmark localization with coarse-to-fine convolutional network cascade". IEEE International Conference on Computer Vision Workshops, 2013, pp. 386-391.

Zhu X. et al. "Face detection, pose estimation, and landmark localization in the wild" IEEE CVPR, 2012, pp. 2879-2886.

\* cited by examiner

FACE DETECTION USING MACHINE LEARNING

FIELD OF THE INVENTION

This invention relates generally to image processing and, more particularly, to object detection using machine learning.

DESCRIPTION OF THE RELATED ART

Face detection systems perform image processing on digital images or video frames to automatically identify people. In one approach, face detection systems classify images into positive images that contain faces and negative images without any faces. Face detection systems may train neural network for detecting faces and separating the faces from backgrounds. By separating faces from backgrounds, face detection systems may determine whether images contain faces. A good face detection system should have a low rate of false positive detection (i.e., erroneously detecting a negative image as a positive image) and a high rate of true positive detection (i.e. all faces in an image should be detected).

Face detection remains challenging because the number of positive images and negative images available for training typically are not balanced. For example, there may be many more negative images than positive images, and the neural network may be trained in a biased manner with too many negative images. As a result, the neural network trained with the imbalance number of positive and negative samples may suffer from low accuracy in face detection with high false positive detection rate or low true positive detection rate.

Face detection also remains challenging because facial appearance may be irregular with large variance. For example, faces may be deformed because of subjects having varying poses or expressions. In addition, faces may be deformed by external settings such as lighting conditions, occlusions, etc. As a result, neural network may fail to distinguish faces from backgrounds and cause a high false positive detection rate.

Thus, there is a need for good approaches to accurate face detection and detection of other objects.

SUMMARY

The present invention overcomes the limitations of the prior art by employing a framework for detecting objects, for example faces. The framework is based on a structure of a convolutional neural network (CNN). One aspect concerns a method for automatically training CNNs for face detection. Another aspect concerns a system for performing face detection by integrating data at different scales (i.e., image sizes) for better use of data in each scale. The system may include CNNs automatically trained using the method disclosed herein.

In one aspect, CNN is trained using a pool with a certain number of images that contain faces ("face images" or "positive images") and a significantly larger number of images without faces ("non-face images" or "negative images"). However, not all the images in the pool are used equally. Rather, a balanced number (i.e., approximately equal number) of face images and non-face images derived from the pool are used for training.

In one implementation, training is performed in stages. The stages may include different training sets for different stages. The training sets may have an approximately equal number of face images and non-face images derived from the images in the pool. The non-face images in the training set for a stage may be selected by including non-face images that were false positives in earlier stages.

Preferably, training continues until a predetermined condition is satisfied. In one aspect, training for a stage continues until a validation cost cannot be improved in a predetermined duration. One measure of validation cost is the negative log likelihood of success rate on a separate validation data set. In another aspect, additional stages may be trained until a number of false positives for the most recent stage falls below a threshold number of false positives.

In one approach, face images in the training sets are derived by altering face images in the pool. In case the training set for a stage includes significantly larger number of non-face images, additional face images may be generated such that the stage has approximately equal number of face images and non-face images. The additional face images may be derived, for example, by rotating, blurring, mirroring or distorting face images.

In one approach, face detection is performed using a bi-scale CNN. The bi-scale CNN enables integration of data at two different scales (i.e., sizes of images). In one architecture, the bi-scale CNN includes two CNNs. Each CNN determines whether the image contains a face, but based on a different size region within the image. Preferably, the CNN that uses the larger size region also includes at least one more convolution layer than the other CNN. An output of the bi-scale CNN may indicate that the image contains a face only if both CNNs indicate that the image contains a face.

In one implementation, the bi-scale CNN employs a common CNN that produces a set of feature patches from the image. This is followed by two CNNs, both of which use the feature patches. For example, one CNN may use the entire set of feature patches as input and the other CNN may use an interior region of the set of feature patches as input.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A disclosed facial detection system (and method) is based on a structure of a convolutional neural network (CNN). In one approach, the CNN is trained using auto-stage training. The auto-stage training trains the CNN from a pool that contains a certain number of face images and a significantly larger number of negative (i.e., non-face) images. The auto-stage training may derive additional face images to balance the number of face images and non-face images.

In one implementation, the face detection is based on a bi-scale CNN to determine whether an image contains a face. The bi-scale CNN includes two CNNs to utilize information in different scales (i.e., different image sizes). For example, a first CNN determines whether the image contains a face based on a first region of predetermined size within the image, and a second CNN determines whether the image contains a face based on a second region of a different predetermined size within the image. The bi-scale CNN indicates the image contains a face only if the first CNN and the second CNN both indicate that the image contains a face.

Face Detection Overview

Figure 1:
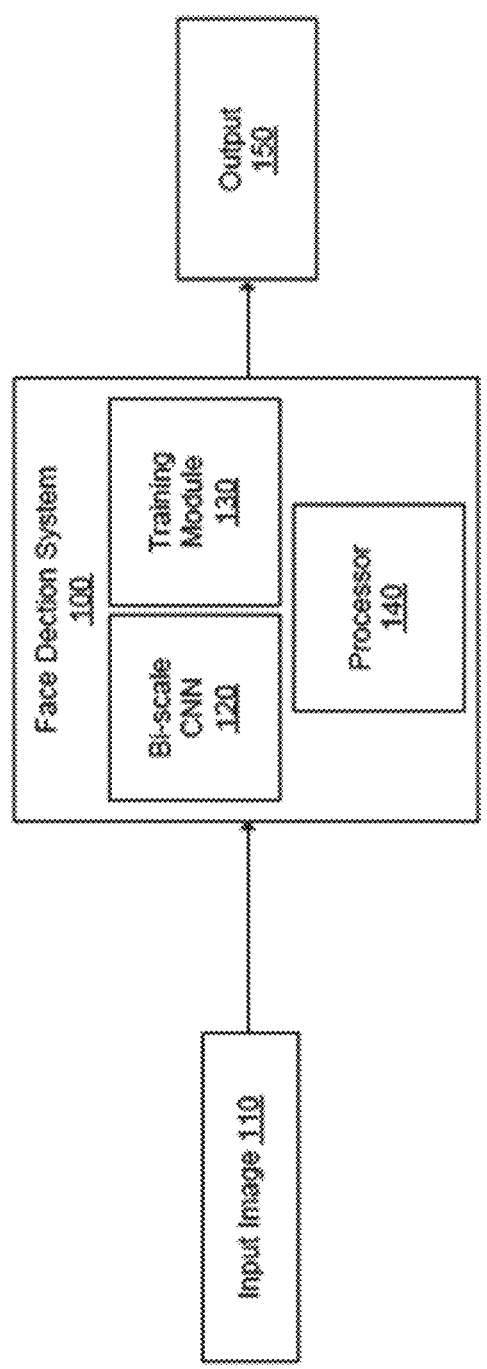
FIG. 1 is a simplified diagram of a face detection system.

FIG. 1 is a simplified diagram of a face detection system 100, according to one embodiment. The face detection system 100 receives an input image 110 and determines whether the input image includes a face. The face detection system 100 generates an output 150 for indicating whether the input image 110 is a face image or a non-face image.

The face detection system 100 includes a bi-scale CNN 120, a training module 130, and a processor 140. The bi-scale CNN 120 performs face detection using neural network. The training module 130 trains neural network in the bi-scale CNN 120. The processor 140 executes instructions to perform face detection on the face detection system 100. Each of these components may be embodied as hardware, software, firmware, or a combination thereof. Together, these components perform face detection of the input image 110.

The bi-scale CNN 120 receives the input image 110 and determines whether the input image includes a face. In one approach, the bi-scale CNN 120 implements at least two CNNs. The bi-scale CNN 120 obtains image patches of different extents (i.e., scales) from the input image 110, and integrates information of the image patches of different extent. In addition, the bi-scale CNN 120 generates the output 150 to indicate whether the input image 110 includes a face.

The training module 130 trains neural network in the bi-scale CNN 120 for performing face detection.

In one aspect, the training module 130 trains CNN using face images and non-face images. The face detection system 100 may have a large database for storing face images and non-face images for different individuals. The database may have imbalanced number of face images and non-face images. For example, the database may include significantly larger number of non-face images. The training module 130 may derive additional face images to balance the number of face images and non-face images for training the CNNs.

The processor 140 executes instructions to perform face detection in the face detection system 100. The processor 140 receives instructions from memory (not shown), or external circuitry. The instructions may also reside, completely or at least partially, within the processor 140 (e.g., within a processor's cache memory). According to the instructions, the processor 140 transforms or selects a portion of the input image 110 to provide to the bi-scale CNN 120. In addition, the processor 140 operates the bi-scale CNN 120 and the training module 130 according to the instructions to perform functions of the face detection. The processor 140 may be implemented in a CPU or a GPU.

Auto-Stage Training of CNN

Figure 2:
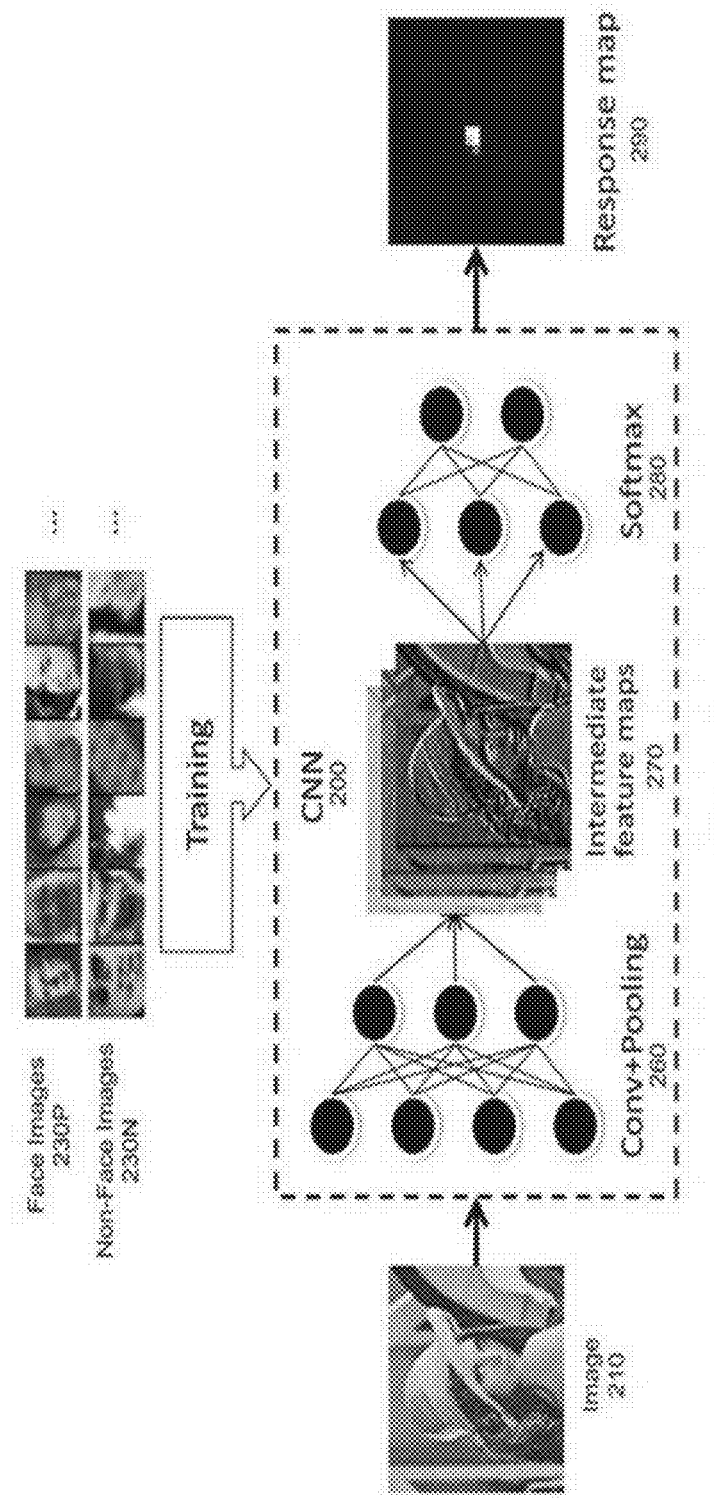
FIG. 2 is a diagram of a general framework for training a convolutional neural network (CNN) and performing face detection using the CNN.

FIG. 2 is a diagram of a general framework for performing face detection using a CNN 200. The bi-scale CNN may include a CNN 200 as illustrated in FIG. 2. The CNN 200 is trained by the training module 130 using face images 230P and non-face images 230N. The CNN 200 may obtain multiple image patches from the face images 230P and non-face images 230N for training the CNN 200. After the training, the CNN 200 receives the input image 210 and determines whether the input image 210 includes a face. In this example, the CNN 200 generates a response map 290, which may indicate a possible face at a corresponding location on the image 210.

In one implementation, the CNN 200 involves a convolution and pooling 260 and softmax function 280. The CNN 200 performs convolution and pooling 260 to generate intermediate feature maps 270 from the image 210. The intermediate feature maps 270 and/or the response map 290 may be smaller than the image 210.

The CNN 200 may include fully connected layers for performing convolution. To localize faces in the image 210, the fully connected layers are converted to convolution layers by treating the output vector as a 1×1 feature map with many channels. For example, if the input to a fully-connected layer is an m×n feature map with k channels and the output is a t dimensional vector, then the resulting layer contains a k×m×n×t convolution. During face detection, the image 210 may be consecutively subsampled by a constant factor (e.g., $\alpha=1.2$) to produce a pyramid of images. Each of the images in the pyramid is applied with convolution and pooling operations 260 and softmax 280, resulting in a response map 290 of face likeliness. In one approach, a high value in the response map 290 indicates a face candidate at the corresponding scale and location in the image 210. Preferably, convolution and pooling layers do not contain any padding. This procedure is equivalent to the sliding-window method, but considerably faster because convolution results of overlapping windows are shared and reused.

In one aspect, the CNN 200 is trained with face images 230P and non-face images 230N to determine optimal weights for performing the convolution and pooling 260, and the softmax function 280. In the database, the number of non-face images may be significantly larger than the number of face images. Training the CNN 200 with imbalanced number of face images 230P and non-face images 230N may bias the CNN 200. Preferably, training is performed with balanced number of face images 230P and non-face images 230N, so that the CNN 200 may be trained in an unbiased manner with low false positive rate.

For example, one situation included about 10,000 fixed size small face images and 30,000 negative samples containing no faces. However, the negative samples were much larger, so that billions of non-face images could be extracted from the negative samples. The billions of candidate non-face images were processed to select the more useful ones for training, for example those that were more likely to be misclassified as containing faces. Thus, even though the original pool may contain 100×, 1000× or even 10000× more non-face images, the training set preferably is selected to have approximately equal numbers (e.g., within 10%, or within 20%) of face and non-face images.

In one embodiment, the CNN 200 is trained in stages. In one aspect, the CNN 200 performs auto-stages training such that the CNN 200 is trained using a balanced number of face images 230P and non-face images 230N derived from an original pool that contains an imbalanced number of face images and non-face images. If the original pool does not contain enough face images, additional "synthetic" face images 230P may be derived from the face images in the pool such that the training set for a stage has approximately equal number of face images 230P and non-face images 230N. The additional face images 230P may be derived, for example, by rotating, blurring, mirroring or distorting face images in the original pool. For example, additional face images 230P are derived by applying random in-lane rotation up to ±20 degrees, gamma correction within [−0.8, 1.2], and horizontal flipping with probability 0.5 on the original face images. Additional face images 230P may be also derived by combining different face images from the original pool.

As training of stages progresses, the CNN 200 is presented with more difficult examples which are closer to the face/non-face boundary. In each stage, the CNN 200 is tested and evaluated to obtain a number of false positives. Training continues with additional stages until the last stage has less than a threshold number of false positives. For other stages with a threshold number or more of false positives, the false positives are bootstrapped and re-used as non-face images 230N for training in the next stage. Preferably, the non-face images 230N for the next stage include all false positives from all previous stages. In one approach, a number of false positives used in a stage increases for each stage (at least for a portion of the training). Hence, for each successive stage, the percentage of false positives from earlier stages is an increasing percentage of the non-face images in the training set. As training proceeds, the newly added difficult non-face images 230N in late stage constitute a smaller portion of all the negative samples, thereby effectively guiding the CNN 200 to fine tune its parameters (or weights) more gently. Hence, the CNN 200 is expected to remember previous true non-face images 230N by not moving too far in the parameter space while still reducing false positive rate by fine-tuning.

Figure 3:
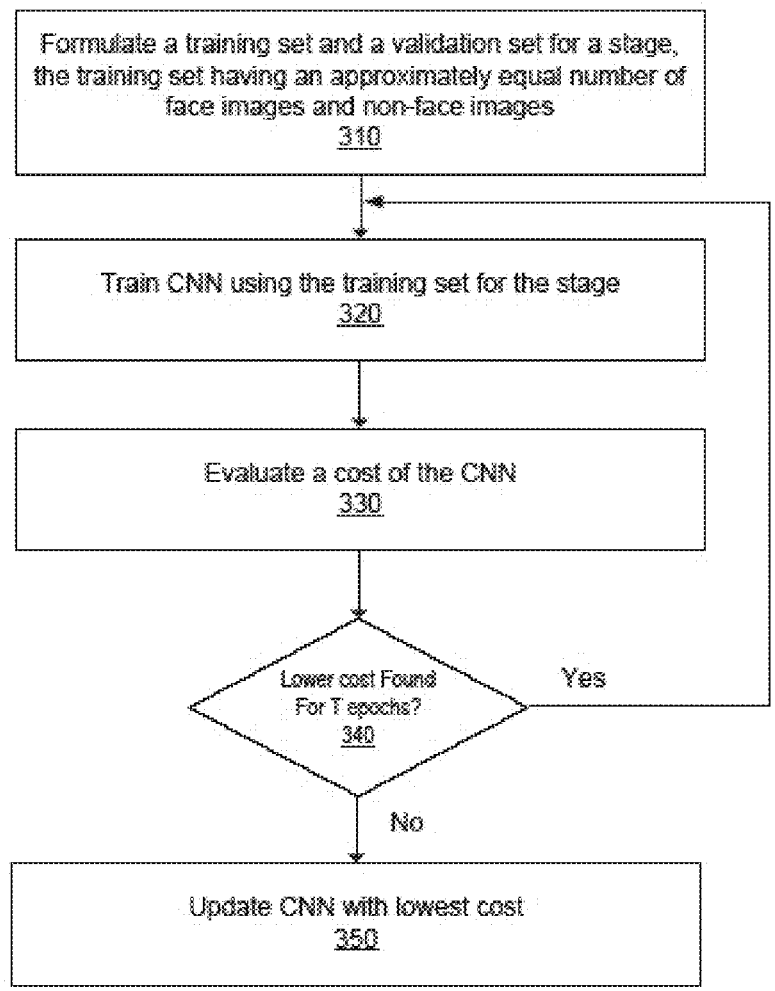
FIG. 3 is a flow diagram of a method of training a CNN in a stage.

FIG. 3 is a flow diagram of a method of training a CNN in a stage, according to one embodiment. In one aspect, the method is performed by the training module 130 or by the processor 140 according to the instructions from the training module 130. In each stage, the training module 130 formulates 310 a training set and a validation set for the stage. The training set has an approximately equal number of face images 230P and non-face images 230N. The training module 130 trains 320 CNN using the training set for the stage. The training module 130 evaluates 330 the CNN using the validation set for the stage and generates a cost of the evaluation (i.e., validation cost), which is the objective value to be optimized. For example, it could be the negative log likelihood of success rate that should be minimized. A number of training performed for the stage is counted.

In each stage, the training module 130 trains the CNN 200 until a predetermined requirement is satisfied. In one approach, the training module determines 340 whether a lower cost can be obtained in predetermined durations (e.g., a predetermined number of trainings or epochs). For example, a lowest validation cost from previous evaluations of the stage is used as a threshold cost. The threshold cost is compared with the cost of evaluation of the stage. If the cost of evaluation is lower than the threshold cost for the stage within the predetermined durations (e.g., a predetermined number of trainings T), the training module 130 updates the threshold cost with the cost of evaluation and resets the counting of the trainings performed. Further, the training module 130 repeats the training and evaluation of the CNN. If a lower cost is not found within the predetermined durations (e.g., the predetermined number of trainings T), the training module 130 updates 350 the CNN with the threshold cost, and ends that stage of training.

In another approach, training in a stage continues until other predetermined condition is satisfied. For example, training in a stage may continue until a validation cost for that stage falls below a threshold cost. The algorithm might check validation cost after each epoch and determine whether the termination criterion is satisfied. Another possible approach would be to train for a predefined number of epochs.

For the CNN with the lowest cost for a stage, the training module 130 compares a number of false positives with a threshold number of false positives. If the CNN in the last training for a stage has a threshold number or more of false positives, the training module 130 bootstraps the false positives and re-uses the bootstrapped false positives as non-face images 230N for training in the next stage. The training module 130 performs training of the next stage with the updated non-face images 230N as described in detail with respect to FIG. 3. If the CNN in the last training for the stage has a less number of false positives than the threshold number of false positives, the training module 130 completes the training. In one approach, training may continue for additional stages until a number of new false positives (i.e., false positives that were not also false positives in the previous stage) for a stage falls below a threshold number. Yet, in another approach, training may continue for additional stages until a number of total false positives for a stage falls below a threshold number.

One approach in the auto-stage training is shown on Algorithm 1.

---

Algorithm 1: Auto-stage training

---

Input : Cropped and aligned face patches 1
Input : Background image pool 1
Input : Threshold T for stopping training a stage
Input : The number of initial negative samples:$n_i$
Input : The number of false positives to add in each stage: $n_a$
Input : Basic training algorithm Train(W , P , N), which returns updated parameter W' based on W , positive set P and negative set N .
Input : Cost evaluation function Eval(W , P , N), which returns the cost of model W on positive set P and negative set N .
Output : Parameter W for the network
1    Initialize W randomly;
2    Randomly crop $n_i$ patches from 1to form initial negative sample set N ;
3    repeat
4    |    Randomly choose and transform |N|(which is the number of
    |    images in N)faces from 1to form the positive sample set P ;
5    |    Split P and N into training set ($P_r$, $N_s$) and validation set ($P_p$ , $N_q$)
6    |    prevUpdateTime ← 0;
7    |    bestCost 1 1
8    |    while prevUpdateTime < T do
9    |    |    W ← Train(W, $P_r$, $N_t$);
10   |    |    currentCost ← Eval(W , $P_s$ , $N_a$);
11   |    |    if currentCost < bestCost then
12   |    |    |    bestCost ← currentCost;
13   |    |    |    bestParam ← W;
14   |    |    |    prevUpdateTime ← 0;
15   |    |    end
16   |    |    else ;
17   |    end -continued Algorithm 1: Auto-stage training

```
18   |     W 1 bestParam
19   |         Try to bootstrap n_a false positives in 1 and add them to N ;
20   until Less than n_a new false positives could be bootstrapped ;
```

Figure 4:
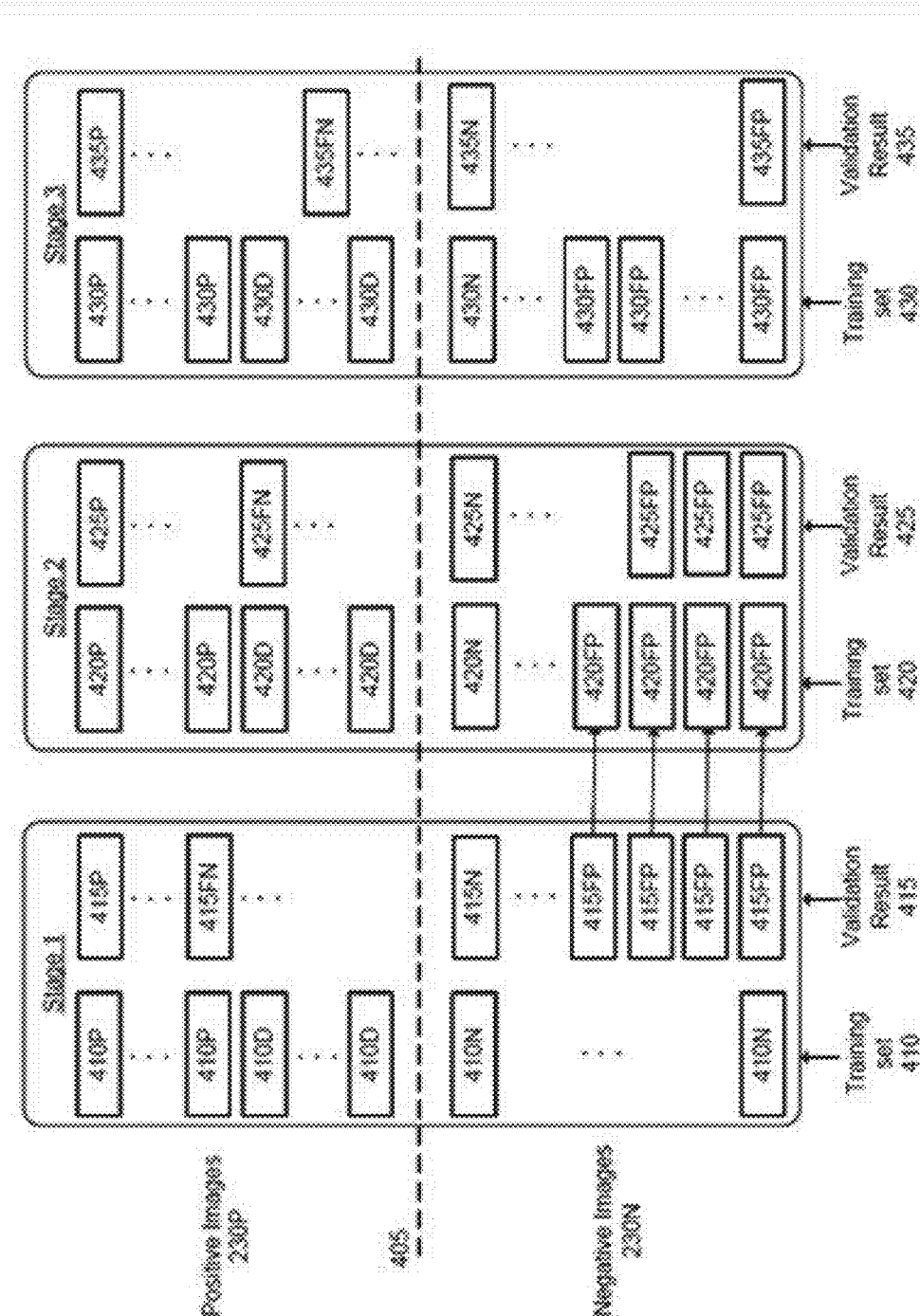
FIG. 4 is an example process of training a CNN using auto-stage training according to an embodiment.

FIG. 4 illustrates an example process of training a CNN using auto-stage training performed by the training module 130, according to an embodiment. In FIG. 4, training of the CNN is performed in three stages. In other embodiments, training may be performed in any number of stages until a number of false positives in the last stage is less than the threshold number of false positives. In this example, the threshold number of false positives is two.

In each stage, the training module 130 trains the CNN with face images 230P above a line 405, and non-face images 230N below the line 405. In each stage, the training module 130 receives samples including positive images and negative images. From the samples, the training module 130 formulates a training set and a validation set. Preferably, each training set has a balanced number of positive images and negative images and each validation set also has a balanced number of positive images and negative images. The training module 130 trains the CNN with the training set and evaluates the trained CNN with the validation set. From the evaluation, the training module 130 counts a number of false positives.

For example, the left column of stage 1 represents the training set 410 used by stage 1. The training set 410 for stage 1 include a certain number of non-face images 410N drawn from the original pool of images. The training set 410 for stage 1 also includes a lower number of face images 410P drawing from the original pool of images. The training module 130 derives additional face images 410D, such that the total number of face images 410P/410D matches the number of non-face images 410N in the training set 410. The training module 130 uses part of the training set 410 for training and part for validation.

The right column of stage 1 represents the validation result. Above the line 405 are the evaluations of face images. 415P are face images that were correctly classified as positive images, and 415FN are face images that were incorrectly classified as non-face images (i.e., false negatives). Similarly, below the line 405, non-face images 415N were correctly classified while non-face images 415FP were false positives. In this example, there are four false positives 415FP. This is more than the threshold number of false positives (e.g., two in this example). Thus, the training module 130 proceeds to the stage 2.

The training set 420 in stage 2 include a certain number of non-face images 420N/420FP. The non-face images include the false positives 415FP from stage 1, as indicated by the arrows and relabeled as 420FP. It may also include new non-face images 420N. The training set 420 also includes face images 420P and/or derived face images 420D to match the number of non-face images. After training this stage, there are three false positives 425FP from evaluation results 425, which is still more than the threshold number of false positives (e.g., two in this example). Thus, the training module 130 proceeds to the stage 3.

The training set 430 in stage 3 include a number of non-face images 430. In one implementation, the non-face images include false positives from only the immediately preceding stage. Therefore, the training set 430 include non-face images 430FP corresponding to the false positives 425FP from the stage 2. It may include all of the false positives from stage 2 or just some of them. In another implementation, the non-face images in the training set include non-face images 430 corresponding to all of the false positives from the immediately preceding stage. Hence, the training set 430 include face images 430FP corresponding to the false positives 415FP and 425P from both stages 1and 2. In this example, after training, there is only one false positive 435FP, which is less than the threshold number of false positives (e.g., two in this example). Thus, the training module 130 completes the training of the CNN.

Bi-Scale CNN

Figure 5:
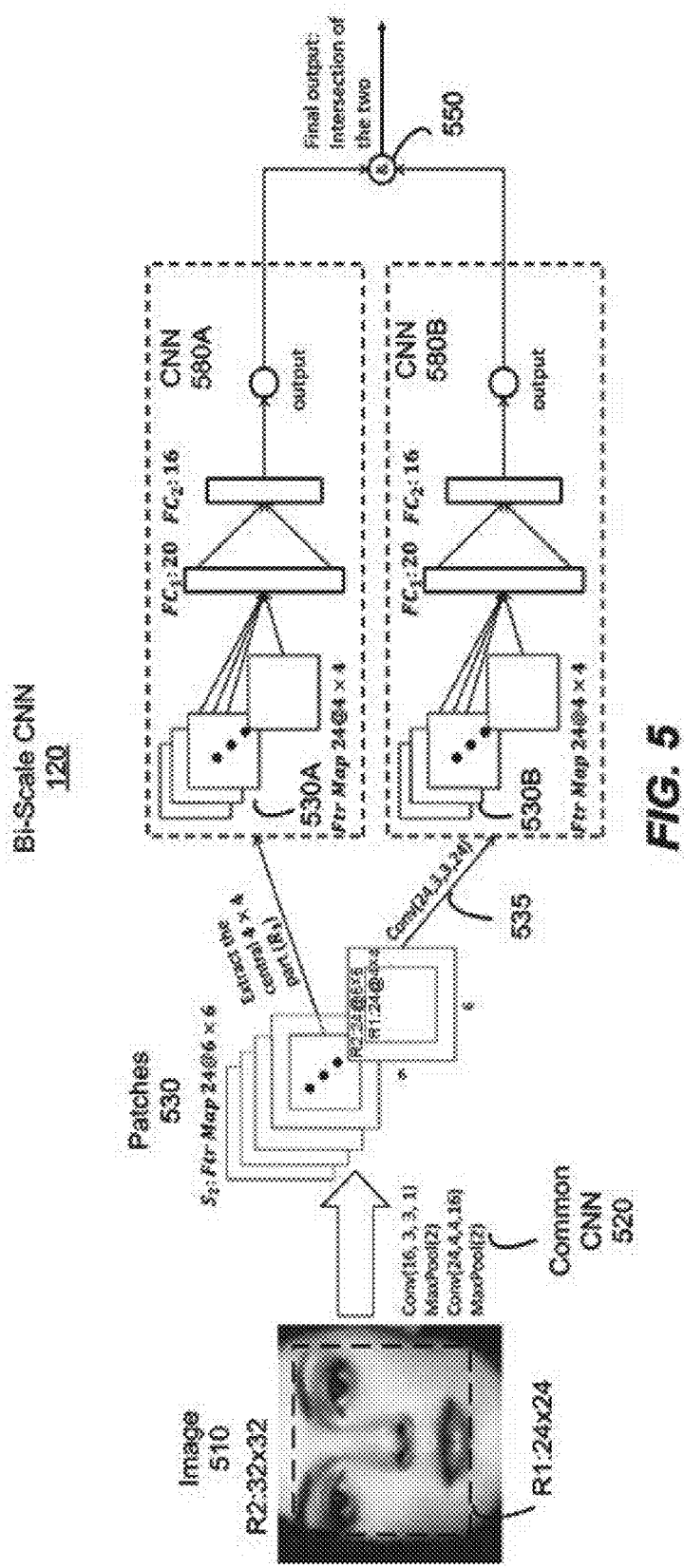
FIG. 5 is a diagram of example architecture of a bi-scale CNN.

FIG. 5 is a diagram of example architecture of a bi-scale CNN 120. The bi-scale CNN 120 receives an image 510 and determines whether the image 510 includes a face. In one embodiment, the bi-scale CNN 120 includes a common CNN 520, a first CNN 580A, a second CNN 580B, and an output generator 550. The CNNs in the bi-scale CNN 120 may be trained according to the auto-scale training by the training module 130. Together, these components aggregate information in two different extents of images to effectively utilize local appearances and global characteristics of the components.

The common CNN 520 receives the image 510 and produces a set of feature patches 530 from the image 510. Preferably, the image 510 has a first region R1 with 24×24 pixels covering a majority part of a possible face and a second region R2 with 32×32 pixels covering the possible face and a background. In one implementation, the common CNN 520 may perform convolution on the image 510 with a 1×3×3×16 kernel, and may downsample the convolved image patches to approximately half size by non-overlapping maxpooling. In addition, the common CNN 520 may perform an additional 16×4×4×24 convolution and maxpooling. As a result, the common CNN 520 generates a set of feature patches 530 of 24 channels with 6×6 spatial dimensions.

The first CNN 580A receives an input set of feature patches 530A and determines whether the image 510 contains a face. The first CNN 580A may extract an interior region of the set of feature patches 530 as the input set of feature patches 530A. Preferably, the interior region of the set of feature patches 530 correspond to the first region of predetermined size within the image 510. For example, the interior region of the set of feature patches 530 has 4×4 dimensions corresponding to 24×24 pixels covering a possible face of the image 510. The first CNN 580A includes two fully connected layers and determines whether the image 510 contains a face based on the first region of predetermined size within the image 510. Hence, the first CNN 580A captures local information of the image 510.

The second CNN 580B determines whether the image 510 contains a face based on the set of feature patches 530. The second CNN 580B may use the entire set of feature patches 530 as the input set of feature patches corresponding to a second region of predetermined size within the image 510. In this example, the entire region of the set of feature patches 530 has 6×6 dimensions corresponding to 32×32 pixels face parts of the image 510, while the interior region of the set of feature patches 530 has 4×4 dimensions corresponding to 24×24 pixels covering a possible face of the image 510. The second CNN 580B may include an additional convolution layer and two fully connected layers. In one aspect, the additional convolution layer 535 produces a set of feature patches 530B that is a same size as the interior region used as the input set of feature patches 530A. For example, the additional convolution layer 535 has 24×3×3×24 kernel, and generates the set of feature patches 530B with 4×4×24 dimensions from the entire set of feature patches 530 with 6×6×24 dimensions. In addition, the two fully connected layers in the second CNN 580B determines whether the image 510 contains a face based on the set of feature patches 530B. The two fully connected layers may share weights in the two fully connected layers in the first CNN 580A. Hence, the second CNN 580B detects a possible face based on the second region of predetermined size within the image 510 and captures global information of the image 510.

The output generator 550 combines results from the first CNN 580A and the second CNN 580B to generate an output to indicate whether the image 510 includes a face. In one aspect, the output generator 550 indicates the image 510 contains a face only if the first CNN 580A and the second CNN 580N both indicate that the image 510 contains a face. The output generator 550 may combine the results from the first CNN 580A and the second CNN 580B sequentially.

In one implementation, the output generator 550 may be implemented by operating the two CNNs 580 sequentially. In one approach, the second CNN 580B determines whether the image 510 contains a face, only if the first CNN 580A has already determined that the image 510 does contain a face. Therefore, the second CNN 580B indicating the image 510 includes a face implies that the first CNN 580A also indicates the image 510 includes a face. Alternatively, the sequence may be reversed and the first CNN 580A determines whether the image 510 contains a face, only if the second CNN 580B has already determined that the image 510 does contain a face.

In one approach, the two CNNs 580 are trained in a partially separated manner. Preferably, the first CNN 580A is trained on 24×24 patches using the auto-stage training algorithm. Then the second CNN 580B is trained on 32×32 patches with weights of the first two convolution layers fixed to that of the first CNN 580A. The initial negative samples may be different. Weight sharing improves both training and detection speed and also reduces model size.

Figure 6:
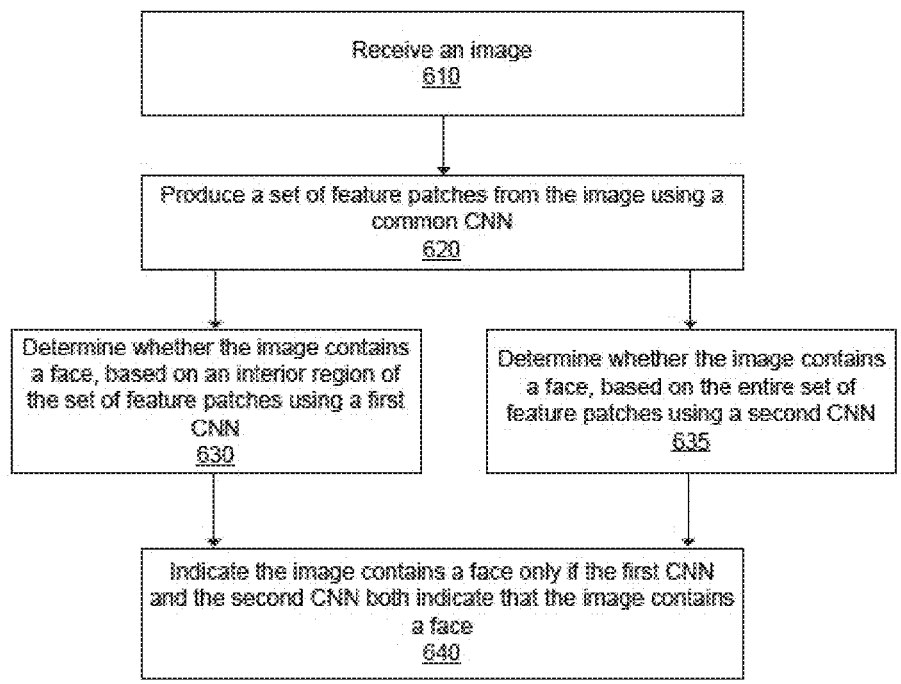
FIG. 6 is a flow diagram of a method of detecting a face.

FIG. 6 is a flow diagram of a method of detecting a face in the image 510. The bi-scale CNN 120 receives 610 an image 510. The bi-scale CNN 120 produces 620 a set of feature patches 530 from the image 510 using a common CNN 520. The bi-scale CNN 120 determines 630 whether the image 510 contains a face based on an interior region of the set of feature patches 530 using a first CNN 580A. Preferably, the interior region of the set of feature patches 530 correspond to a first region of predetermined size within the image 510 covering a majority part of the possible face. In addition, the bi-scale CNN 120 determines 635 whether the image 510 contains a face based on the entire set of feature patches 530 using a second CNN 580B. Preferably, the entire set of feature patches correspond to a second region of predetermined size within the image 510 covering the possible face and a background. The bi-scale CNN 120 indicates 640 the image contains a face only if the first CNN 580A and the second CNN 580B both indicate the image contains a face.

Beneficially, the face detection system 100 preferably improves accuracy in the face detection. The auto-scale training improves the accuracy by dynamically balancing the number of face images and non-face images from a pool that contains an unbalanced number of face images and non-face images. In addition, the auto-scale training improves the accuracy by adaptively changing a number of trainings of a stage according to automatic stopping criteria. For example, the training is performed until a validation cost cannot be updated in predetermined epochs. Moreover, the bi-scale CNN 120 improves the accuracy by combining results from the first CNN 580A and the second CNN 580B. Therefore different aspects of the image can be captured. As a result, false positive rate can be reduced. Utilizing different aspects of the image allows more robust face detection even with irregular face appearance, for example due to varying poses, expressions, lighting conditions, occlusions and etc. The face detection system 100 employing the bi-scale CNN 120 trained with the auto-stage training achieves 81.6% detection rate with only six false positives on Face Detection Data Set and Benchmark (FDDB), where current state of the art achieves about 80% detection rate with 50 false positives.

In addition, the face detection system 100 may achieve significant improvements in speed in the face detection. By sharing weights in the first CNN 580A and the second CNN 580B of the bi-scale CNN 120, both training and detection speed can be enhanced. The bi-scale CNN 120 has enough capacity to perform multi-view face detection directly, hence labeling face poses and dividing them into different categories can be eschewed. With the improved face detection speed, the face detection system 100 may be implemented on a modern GPU at real-time speed. For example, the face detection system 100 is implemented in NVIDIA CUDA API on x86/64 Linux platform. When processing the images frame-by-frame, the face detection system 100 runs at 24 fps on VGA images (640×480 pixels) on a single NVIDIA GTX Titan Black. If a batch of 10 images is fed holistically, then the speed rises up to 32 fps. Implementing the face detection system 100 on a CPU by naively replacing GPU kernels with corresponding CPU implementations without optimization achieves 1.38 fps on a single thread of Intel Core i7.

Simulation Results

In order to evaluate the performance of the auto-stage training of the CNN and the bi-scale CNN 120 on face detection, experiments with different approaches are performed on Face Detection Data Set and Benchmark (FDDB).

To evaluate the effectiveness of the auto-stage training, the first CNN 580A is trained using different approaches. To verify the effectiveness of automatic stopping criteria (herein referred to as "autostop"), the first CNN 580A is trained with fixed number of epochs in each stage for comparison. To verify the effectiveness of dynamically augmenting the face images to balance the number of face images and non-face images, the first CNN 580A is trained with pre-generated face images that are simply duplicated face images without derivations performed in the auto-stage training. The results are summarized in Table 1.

TABLE 1

Performance of different configurations for auto-stage training, Autostop is the automatic stopping criteria in stage training, and dynaugis the dynamic augmentation of positive samples.

| Training | Method | Recall Rate | False positives | Precision | F1 Score |
|---|---|---|---|---|---|
| 1 | autostop + dynaug | 0.8378 | 72 | 0.9837 | 0.9049 |
| 2 | fix 26 epochs + dynaug | 0.8363 | 175 | 0.9612 | 0.8944 |
| 3 | fix 40 epochs + dynaug | 0.8429 | 222 | 0.9516 | 0.8939 |
| 4 | fix 55 epochs + dynaug | 0.8517 | 703 | 0.8626 | 0.8571 |
| 5 | fix 70 epochs + dynaug | 0.8486 | 526 | 0.8931 | 0.8703 |
| 6 | autostop + dup(50000) | 0.8282 | 207 | 0.9540 | 0.8866 |
| 7 | autostop + dup(100000) | 0.8369 | 112 | 0.9748 | 0.9006 |

In Table 1, the CNN trained with the training 1 according to the auto-stage training achieves the highest F1 score with only 72 false positives. The CNNs trained according to trainings 2-5 using fixed number of trainings with the dynamic augmentation achieve tower F1 scores and higher false positives. In addition, the CNNs trained according to trainings 6-7 using the automatic stopping criteria with pre-generated face images achieve lower F1 score and higher false positives. Hence, the auto-stage training improves accuracy of the face detection.

To evaluate the effectiveness of the hi-scale CNN 120, each CNN 580 is tested on FDDB separately.

The results are summarized in Table 2.

TABLE 2

Performance of a bi-scale CNN and individual CNNs.

| Model | Recall Rate | False positives | Precision | F1 Score |
|---|---|---|---|---|
| bi-scale CNN 120 | 0.8162 | 6 | 0.9986 | 0.8982 |
| first CNN 580A | 0.8378 | 72 | 0.9837 | 0.9049 |
| second CNN 580B | 0.8228 | 47 | 0.9891 | 0.8983 |

As listed in Table 2, integration of different scales of information using two CNNs 580 significantly improves the accuracy of the detection. Despite F1 score of the hi-scale CNN 120 is not the highest, F1 score of the hi-scale CNN 120 is substantially close to those of the first CNN 580A and the second CNN 580B. Meanwhile, implementing the bi-scale CNN 120 achieves 6 false positives, when implementing only the first CNN 580A achieves 72 false positives and implementing only the second CNN 580B achieves 47 false positives. Thus, the hi-scale CNN architecture is effective when great accuracy with low false positive rate is desired such as in practical applications.

Although the detailed description contains many specifics, these should not be construed as limiting the scope of the invention but merely as illustrating different examples and aspects of the invention. It should be appreciated that the scope of the invention includes other embodiments not discussed in detail above. For example, the principles disclosed in the hi-scale CNN 120 or the auto-scale training can also be applied to other areas or objects besides face detection. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed:

1. A method implemented on a computer system to automatically detect faces in images, the method comprising:
    training a convolutional neural network (CNN) on face detection, the CNN including convolution, pooling and softmax functions, the training using a pool containing face images and non-face images, the training occurring in stages, the stages comprising:
        formulating a training set for the stage, the training set having face images and non-face images derived from the images in the pool, the non-face images including non-face images that were false positives in earlier stages; and
        training the CNN using the training set for that stage to optimize weights for the convolution, pooling, and softmax functions;
        wherein training continues for additional stages until a number of new false positives for a stage falls below a threshold, and the new false positives were not also false positives in a previous stage;
    incorporating the trained CNN in a face detection system; and
    using the face detection system with trained CNN to detect faces in images.

2. The method of claim 1 wherein the training further comprises:
    deriving synthetic face images by combining different face images from the pool;
    the training set further including synthetic face images derived from the face images in the pool; wherein inclusion of the synthetic face images in the training set increases a total number of face images used in training.

3. The method of claim 2 wherein the stages further comprise:
    formulating a validation set of face images and non-face images for the stage, wherein the training set is used to train the CNN during that stage and the validation set is used to calculate the validation cost for that stage, and the validation cost is used to determine whether to continue training for the stage.

4. The method of claim 2 wherein training for a stage continues until a validation cost for that stage falls below a threshold cost.

5. The method of claim 2 wherein training for a stage continues until a validation cost for that stage does not improve within a predetermined training duration.

6. The method of claim 5 wherein the predetermined duration is a predetermined number of trainings for the stage.

7. The method of claim 2 wherein training continues for additional stages until a number of total false positives for a stage falls below a threshold.

8. The method of claim 2 wherein, for each successive stage, a percentage of false positives from earlier stages is an increasing percentage of the non-face images in the training set.

9. The method of claim 2 wherein the training set for a stage includes all of the false positives from the immediately preceding stage.

10. The method of claim 2 wherein the training set for a stage includes false positives from only the immediately preceding stage.

11. The method of claim 2 wherein the training set for a stage includes false positives from multiple preceding stages.

12. The method of claim 2 further comprising:
deriving additional face images by altering face images in the pool, wherein the training sets for the stages further include the additional face images.

13. The method of claim 12 wherein the additional face images in the training sets are derived by rotating, blurring, mirroring or distorting face images in the pool.

14. The method of claim 2 wherein the computer system includes a GPU, and training the CNN is implemented on the GPU.

15. The method of claim 2 wherein the CNN is a bi-scale CNN having a first CNN and a second CNN that share weights.

* * * * *